Patented Feb. 27, 1934

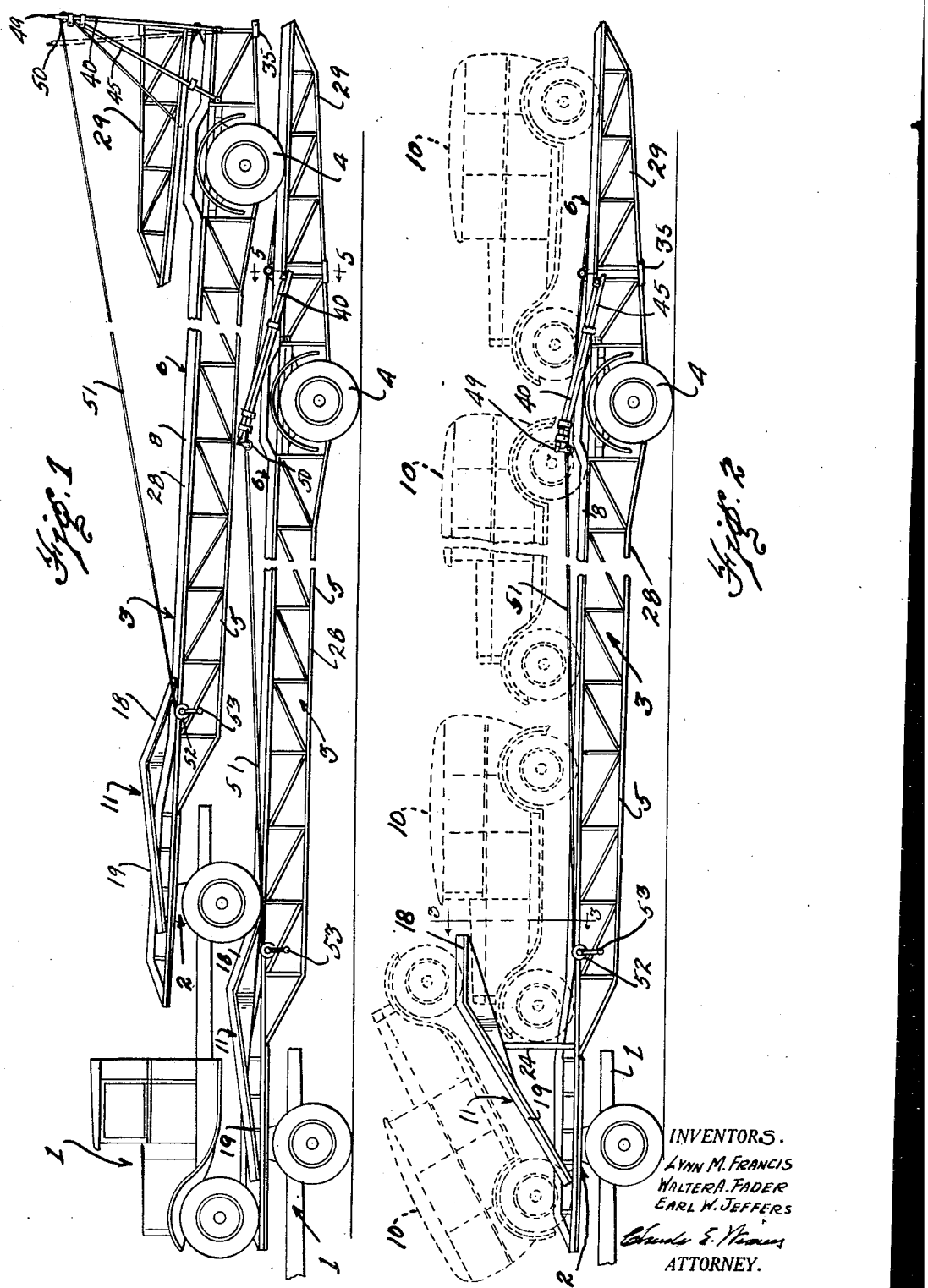

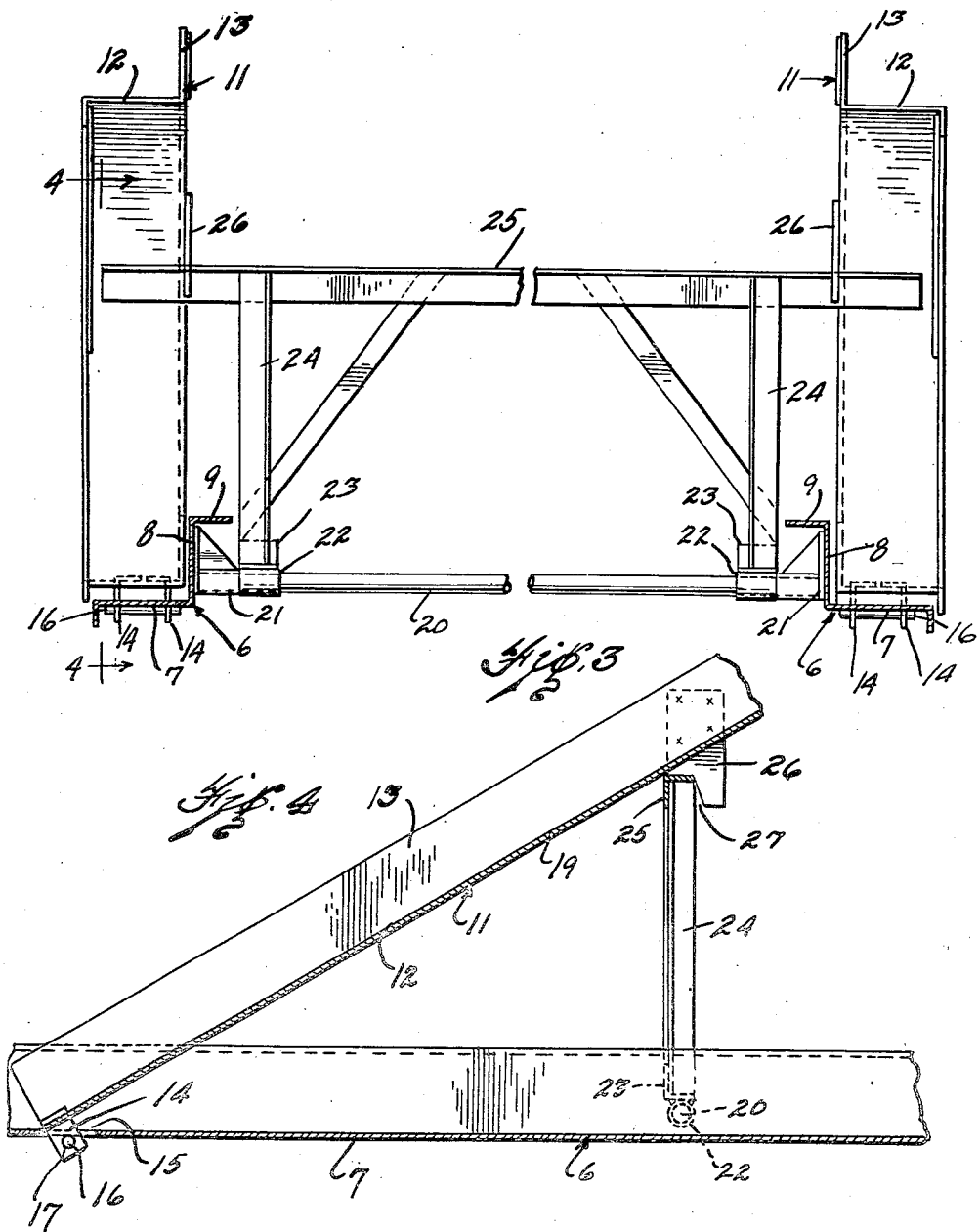

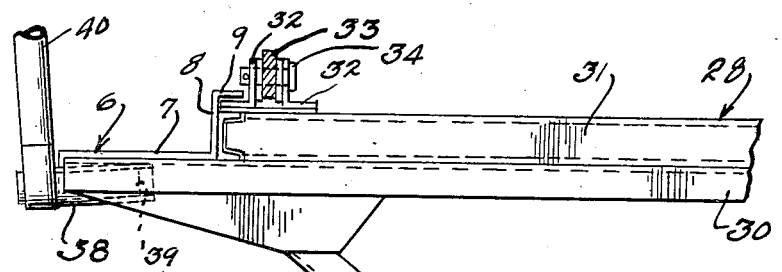
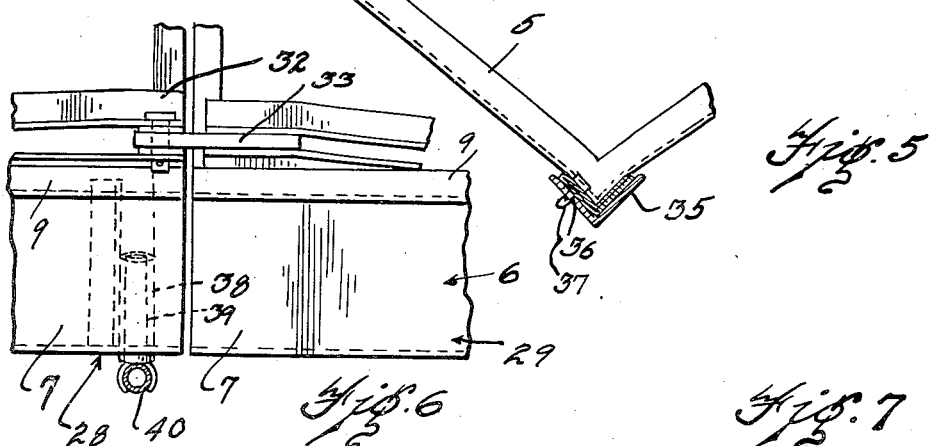
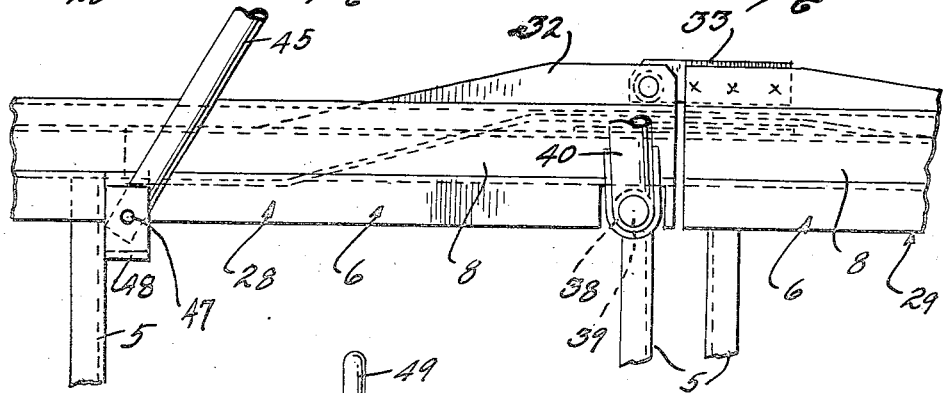

1,949,156

UNITED STATES PATENT OFFICE 1,949,156

SEMITRAILER

Lynn M. Francis and Earl W. Jeffers, Detroit, and Walter A. Fader, Birmingham, Mich., assignors, by mesne assignments, to Whitehead and Kales Company, Detroit, Mich., a corporation of Michigan Application April 21, 1931. Serial No. 531,740

15 Claims. (Cl. 280—33.1)

This invention relates to semi-trailers of the type used for transporting assembled automobiles.

It has been the practice heretofore to make these trailers as long as possible in order to provide space for transporting a maximum number of automobiles at one time and due to the extreme length that some of these trailers have been made a large number of States have passed legislation limiting the overall length of these devices.

It is therefore an object of this invention to provide a trailer of maximum length, the rear end of the same being provided with a hinged end section so that the same may be folded back upon the main portion of the trailer so that one truck and its attached trailer may be placed upon the trailer of a second truck and trailer and keep the overall length of the two trailers within the maximum length permitted by law.

Another object of the invention is to provide a simple and easily operated mechanism for folding the rear hinged section upon the main portion of the trailer and likewise for moving the section from its folded position to a position in line with the main portion of the trailer.

A still further object is to provide a trailer having a rear hinged section and provided at its forward end with a hinged ramp so that the maximum number of automobiles may be transported when the ramp is raised and which will permit a second truck and trailer to be placed thereon when the ramp is lowered thereby permitting the two trucks and trailers attached thereto to be transported on the return trip under the power of only one truck.

These objects and the several novel features of the invention are hereinafter more fully described and claimed and the preferred form of construction by which these objects are attained is shown in the accompanying drawings in which—

Fig. 1 is a side elevation of a truck and trailer constructed in accordance with my invention mounted upon a second trailer.

Fig. 2 is a side elevation of a portion of a truck and a semi-trailer secured thereto and having mounted thereon a plurality of automobiles.

Fig. 3 is a sectional view taken substantially on line 3—3 of Fig. 2.

Fig. 4 is a similar view taken on line 4—4 of Fig. 3.

Fig. 5 is a sectional view taken on line 5—5 of Fig. 1.

Fig. 6 is a detail plan view of the hinged connection of the rear section.

Fig. 7 is a side elevation thereof.

Fig. 8 is an enlarged detail of the upper end of the post and brace.

Referring now to the drawings it will be seen that the truck 1 is of standard construction and is provided adjacent its rear end with the usual connection 2 for permitting the semi-trailer 3 to be attached thereto in the usual manner.

The trailer 3 has the ordinary road wheels 4 and the braces 5 for supporting the tracks or runways 6 extending longitudinally the full length of the trailer. The tracks 6 comprise the horizontally extending portions 7, the vertically extending portions 8 and the horizontally inturned portions 9. The horizontally extending portions 7 are spaced apart a distance approximately equal to the standard tread of an automobile and the vertical portions 8 prevent side displacement of the automobiles 10 when the same are driven thereon.

By referring to Figs. 3 and 4, it will be seen that the ramps 11 comprise the horizontal extending portions 12 and the vertically extending portions 13 the distance between the portions 13 being slightly greater than the distance between the portions 8 of the tracks 6 so that when the ramps 11 are lowered the horizontal portions 12 will lie upon the upper face of the horizontal portions 7 of the tracks 6 to permit the truck 1 to be driven onto the tracks 6 and over the ramps 11 until it has attained the position shown in Fig. 1. The forward ends of the horizontal portions 12 of the ramps 11 are provided with the downwardly extending brackets 14 extending through apertures 15 provided in the horizontal portions 7 of the tracks 6 and pins 16 are welded to the lower face of the portions 7 and extend through apertures 17 provided in the brackets 14 so that the ramps 11 may be raised or lowered pivoting about the pins 16.

By referring to Figs. 1 and 2 it will be seen that the ramps 11 are downwardly inclined toward the rear as indicated at 18 and are upwardly inclined toward the intermediate portions as indicated at 19 and when the ramps are in the lowered position the rear ends of the horizontal portions 12 thereof contact the upper faces of the horizontal portions 7 of the tracks 6 and the forward ends of the inclined portions 18 likewise are in close relation to the upper face of the horizontal portion 7 so that the front wheels of the truck 1 may be readily driven up the incline 18 and down the incline 19 to the position shown in Fig. 1. When the ramp is in the raised position as shown in Fig. 2 the downwardly inclined portion 18 becomes approximately horizontal and forms a rest for the front wheels of one of the automobiles 10.

A rod 20 is supported in brackets 21 secured to the inner face of the vertical portions 8 and sleeves 22 encircle the rod 20 and are positioned adjacent the inner ends of the brackets 21 and have secured thereto the angle bars 23 which are welded to the angle bars 24. The horizontally disposed angle bar 25 is welded or otherwise secured to the upper ends of the bars 24 and the plates 26 are preferably welded to the inner faces of the vertical portions 13 of the ramps 11 and are notched at 27, as is more clearly illustrated in Fig. 4, to rest upon the horizontal portion of the bar 25.

It will thus be seen that when the weight is off the ramps 11 the same may be lifted until the notches 27 disengage the bar 25 whereupon the bars 24 and the bar 25 may be swung down out of the way to allow the ramps 11 to be lowered, as will be readily understood. It will be understood that it is necessary to use the ramps 11 to support one automobile when automobiles of a certain length are being transported as the overall length of the semi-trailer is not sufficient to place all of the automobiles in end to end relation, and by placing the hood of the second automobile beneath the portions 18 of the ramps sufficient additional space is secured to permit all but the one automobile on the ramps 11 to be placed in end to end relation. It will be seen that the semi-trailer 3 comprises the sections 28 and 29 the manner of connecting the same becoming more evident by referring to Figs. 5, 6 and 7. The rear end of the section 28 is provided with the transversely extending beam 30 positioned below the horizontal faces 7 of the tracks 6 to which the braces 5 are secured, the same being in the form of a V, as will be clearly evident by referring to Fig. 5. A second transverse bar 31 is positioned above the bar 30 and extends between the vertical portions 8 of the tracks 6. The angle brackets 32 are secured to the upper face of the bar 31 and a pair of bars 33 are secured to the forward end of the section 29 and extend forwardly thereof and are positioned between the brackets 32.

The pins 34 extend through the brackets 32 and the bars 33 and act as pivots to permit the section 29 to be swung therearound. It will be seen that an angle bracket 35 is secured to the braces 5 on the section 28 and extends rearwardly therefrom and is provided with an aperture 36 adapted to receive a bolt or pin 37 for locking the sections 28 and 29 together when the section 29 is in the extended position. Although the device as here shown constitutes a hinged rear section it is to be understood that various forms of extensions may be used without departing from the scope of the appended claims.

By referring to Fig. 5 it will be seen that a circular sleeve or socket 38 is secured to the section 28. And near the rear end thereof and is downwardly inclined toward the outside thereof and forms a bearing for the stud 39 extending at right angles from the lower end of the vertically extending post 40. A pair of clips 41 and 42 are secured to the posts 40 near the upper end thereof and the forwardly extending portions of the clips 41 and 42 are provided with the respective apertures 43 and 44 and a brace 45 is provided near the upper end thereof with an aperture and a bolt or pin 46 extends through one of the apertures in one of the clips and likewise through the aperture in the upper end of the brace 45. The lower end of the brace is held in place by the pin 47 extending through an aperture in bracket 48 secured to the section 28 and likewise through an aperture provided in the lower end of the brace.

The extreme upper end of the post 40 is provided with the inturned portion 49 to which the pulley 50 is attached. It will be seen that since the sleeve 38, in which the stud 39 is pivoted, slopes downwardly toward the outside, that the upper end of the post 40 and braces 45 will clear the section 29 when it is swung about the pivot 34. A cable 51 passes over the pulley 50 and has one end secured to the section 29 intermediate its ends and the other end secured to a windlass 52 positioned near the forward end of the section 28 and operable by a handle 53. When the upper end of the brace 45 is secured in the clip 42, the post 40 will extend at an angle to the vertical center line of the sleeve 38 and the upper end of the post carrying the pulley 50 will be positioned rearwardly of the vertical center line of the pivot 34 connecting the sections 28 and 29 together and when the upper end of the brace 45 is positioned in the clip 41 the upper end of the post 40 will be positioned forwardly of the vertical center line of the pivot 34. When the parts are so arranged it will be seen that the section 29 may be raised by turning the windlass 52 until the center of gravity of the section 29 passes the vertical center line of the pin 34 whereupon the weight of the section will cause it to drop down until it lies in the position shown in Fig. 1.

When it is desired to move the section 29 to its extended position the upper end of the brace 45 will be placed in the clip 41 and then upon operation of the windlass the section 29 will be raised from the position as occupied in Fig. 1 until the center of gravity of the same passes by the vertical center line of the pivot pin 34, whereupon the weight of the section will cause it to move down to the extended position as shown in Fig. 2.

When two trucks and their semi-trailers are used to transport automobiles to a given destination both of the trailers will be loaded in the usual way with automobiles, as shown in Fig. 2. When the trucks have reached their destination and the automobiles unloaded from the trailers attached to the trucks the ramps 11 will be lowered to the position shown in Fig. 1 and one of the trucks 1 and its trailer 3 will be driven upon the trackways 6 of the second trailer and the section 29 of the superimposed trailer will be swung up and then let down to the position shown in Fig. 1, so that the entire length of the two trucks and their trailers is no longer than the length of one of the trucks and its trailer.

From the foregoing description it becomes evident that we have provided a semi-trailer which is of maximum length permitted by law and which comprises a front and rear section, the rear section being arranged so that it is movable in relation to the front section so that when the rear section is moved the entire overall length of the two sections is not materially greater than that of the front section. It is further evident that we have provided a novel and simple means for moving the rear section from its extended position to its folded position above the front section or to move it from its folded position to its extended position and it is still further evident that by the use of the hinged ramp at the forward end of the trailer a maximum number of cars may be transported upon the trailer or the ramp may be swung down to permit a second truck and trailer to be superimposed thereon.

Having thus fully described our invention, its utility and mode of operation, what we claim and desire to secure by Letters Patent of the United States is—

1. A trailer comprising a front and a rear section, movable relative to each other from an extended to a folded position, each section provided with a pair of spaced longitudinal extending tracks, the pair of tracks on one section aligned with the pair of tracks on the other section forming a practically continuous trackway when the rear section is in the extended position, and means for moving one of the sections relative to the other so that the overall length of the two sections in the folded position is not materially greater than the length of one of the sections.

2. A trailer comprising a front and a rear section movable relative to each other about a horizontal pivot from a folded to an extended position and in end to end contact in the extended position, and means for moving the rear section to a position approximately parallel to the front section so that the overall length of the two sections in the folded position is not materially greater than the length of the front section.

3. A trailer comprising a front and a rear section movable relative to each other from an extended to a folded position, each section having a pair of spaced longitudinally extending tracks providing a continuous trackway, a ramp hingedly connected to the front section and movable from a position in alignment with the pair of tracks on the front section for the passage of a wheeled vehicle thereover to an inclined position for supporting an automobile, and means for moving the rear section relative to the front section so that the overall length of the two sections in the folded position is not materially greater than that of the front section.

4. A semi-trailer having a substantially horizontal main frame, tracks on said main frame having substantially horizontal and upright portions, a rod extending between the upright portions of said tracks, brackets carrying said rod and secured to said tracks, sleeves on said rod, ramps movable from a position in line with the tracks for the passage of a wheeled vehicle thereover to an inclined position for supporting an automobile, means pivotally connecting the ramps at one end thereof to the horizontal portions of the tracks, and means for supporting the free ends of said ramps when in inclined position including propping means carried by said sleeves and engageable with said ramps.

5. A semi-trailer having a substantially horizontal main frame, tracks on said main frame having substantially horizontal and upright portions, a rod extending between the upright portions of said tracks, brackets carrying said rod and secured to said tracks, sleeves on said rod, ramps movable from a position in line with the tracks for the passage of a wheeled vehicle thereover to an inclined position for supporting an automobile, means pivotally connecting the ramps at one end thereof to the horizontal portions of the tracks, and means for supporting the free ends of said ramps when in inclined position including plates rigid with said ramps and having downwardly opening notches therein, angle bars rigid with the sleeves aforesaid, angle bars rigid with the angle bars just mentioned, and an angle bar secured to the last mentioned angle bars and engageable with the notches in the plates carried by said ramps.

6. A trailer having a front section, a rear section connected to said front section and movable from an extended position substantially in line with said front section to a folded position substantially parallel to said front section, an upright post, a pivot for the post carried by the front section, a pair of clips secured to the post at the upper end thereof, a brace for the post pivotally connected to the front section and alternately attachable to said clips, a pulley carried by the post above the clips, the arrangement being such that the pulley will be positioned rearwardly of the vertical center line of the pivot for the post when the brace is secured to the lowermost clip and will be positioned forwardly of the vertical center line of the pivot for the post when the brace is secured to the uppermost clip, and means operable when the brace is secured to the lowermost clip to move the rear section from extended position to folded position, and operable when the brace is secured to the uppermost clip to move the rear section from folded position to extended position, including a windlass positioned near the forward end of the front section, and a cable passing over the pulley and terminally connected to said windlass and to the rear section intermediate its ends.

7. A trailer having a front section and a rear section, the rear section being movable vertically relative to the front section about a horizontal pivot from a folded to an extended position, said sections being in end to end contact when the rear section is in the extended position, and means for moving the rear section from an extended to a folded position and vice versa, said rear section being approximately parallel to the front section when in the folded position so that the over-all length of the two sections in the folded position is not materially greater than the length of the front section.

8. A trailer having a substantially horizontal main frame, tracks on said main frame, a rod extending between said tracks, brackets carrying said rod and secured to said tracks, sleeves on said rod, ramps movable from a position in line with the tracks for the passage of a wheeled vehicle thereover to an inclined position for supporting an automobile, means pivotally connecting the ramps at one end thereof to the tracks, and means for supporting the free ends of said ramps when in inclined position including propping means carried by said sleeves and engageable with said ramps.

9. A trailer having a substantially horizontal main frame, tracks on said main frame, a rod extending between said tracks, brackets carrying said rod and secured to said tracks, sleeves on said rod, ramps movable from a position in line with said tracks for the passage of a wheeled vehicle thereover to an inclined position for supporting an automobile, means pivotally connecting the ramps at one end thereof to the horizontal portions of the tracks, and means for supporting the free ends of said ramps when in inclined position including bars rigid with the sleeves aforesaid, bars rigid with the bars just mentioned, and a bar secured to the last mentioned bars and forming a rest for said ramps.

10. A trailer comprising a front and a rear section, the rear section being movable vertically relative to the front section from an extended to a folded position, and means for moving one of the sections relative to the other so that the overall length of the two sections in the folded position is not materially greater than the length of one of the sections.

11. A trailer comprising a front and a rear section, a horizontal pivot connecting adjacent ends of said front and rear sections whereby the rear section is movable vertically from an extended position in alignment with the front section to a folded position approximately parallel to the front section, and means for moving said rear section from extended to folded position and vice versa.

12. A trailer comprising a front and a rear section, a horizontal pivot connecting adjacent ends of said front and rear sections whereby the rear section is movable vertically from an extended position in alignment with the front section to a folded position approximately parallel to the front section, and actuating means for said rear section including a post connected to the front section, a brace connected to the front section and adjustable longitudinally of the post, a windlass carried by the front section, a pulley carried by the post, and a flexible element trained over said pulley and terminally connected to said windlass and rear section.

13. A trailer having a substantially horizontal frame, tracks extending longitudinally of said frame and having slots therein, automobile carrying ramps movable on the tracks from a substantially horizontal position to an inclined position, means pivotally connecting the ramps to the tracks including lugs extending from said ramps through said slots, and pivot pins extending transversely of said lugs beneath said tracks, and means for supporting the upper ends of said ramps when in an inclined position, including means also pivotally connected to said tracks.

14. A trailer having a front section and a rear section, each section being provided with a pair of spaced longitudinally extending tracks for automobiles, a horizontal pivot connecting adjacent ends of said front and rear sections whereby the rear section is movable vertically from an extended position in alignment with the front section to a folded position approximately parallel to the front section, and means for moving the rear section from an extended to a folded position and vice versa.

15. An automobile transporting trailer having a substantially horizontal main frame, a track for automobiles extending longitudinally of said frame from one end thereof to the other, a brace having legs pivotally connected to said track and having a transversely extending member carried by said legs, and an upwardly and rearwardly inclined ramp pivoted at its lower forward end to said track in advance of said brace and adapted to rest upon the transversely extending member of said brace when the latter is in an upright position, means cooperating with the ramp and transversely extending member for holding the ramp on said member when the latter is in said upright position, said brace being movable from said upright position to a substantially horizontal position, and said ramp being movable from the inclined position aforesaid to a substantially horizontal position on the track when the brace is in said horizontal position for receiving an automobile from said track.

LYNN M. FRANCIS.
EARL W. JEFFERS.
WALTER A. FADER.